United States Patent [19]

Law et al.

[11] Patent Number: 5,208,165

[45] Date of Patent: May 4, 1993

[54] METHOD FOR TESTING THE SOLUBLE CONTENTS OF NUCLEAR REACTOR COOLANT WATER

[75] Inventors: Robert J. Law; Michel N. Robles, both of Livermore; Dane T. Snyder, San Jose, all of Calif.

[73] Assignee: General Electric Company, San Jose, Calif.

[21] Appl. No.: 648,096

[22] Filed: Jan. 31, 1991

[51] Int. Cl.$^5$ .............................................. G01N 33/18
[52] U.S. Cl. .................................. 436/176; 376/245; 436/38; 436/73; 436/178
[58] Field of Search .................... 436/38, 73, 176, 178; 376/245

[56] References Cited

U.S. PATENT DOCUMENTS

| | | | |
|---|---|---|---|
| 4,374,041 | 2/1983 | Matson | 436/73 X |
| 4,472,354 | 9/1984 | Passell et al. | 422/62 |
| 4,937,038 | 6/1990 | Sakai et al. | 422/80 X |

*Primary Examiner*—Jill A. Johnston
*Attorney, Agent, or Firm*—Robert R. Schroeder

[57] ABSTRACT

Water testing means for monitoring circulating water coolant in service within a water cooled nuclear reactor system is disclosed. The invention is an improvement in such water testing means and comprises a preconditioning of selected sample specimens of water with a pH adjustment for inhibiting unbalancing an equilibrium in solution of water coolant with ion solutes.

15 Claims, 3 Drawing Sheets

METHOD FOR TESTING THE SOLUBLE CONTENTS OF NUCLEAR REACTOR COOLANT WATER

FIELD OF THE INVENTION

This invention relates to the analytical testing of the coolant water circulating throughout a water cooled and moderated nuclear fission reactor plant. The invention comprises an improvement in such analytical testing including a preanalysis adjustment of water specimens sampled for testing.

BACKGROUND OF THE INVENTION

Typical boiling water and pressurized water nuclear fission reactor plants comprise a nuclear fission reactor having an enclosed body of heat producing fissionable fuel which is associated with steam driven turbines for propelling electrical generators. Reactor coolant water is continuously circulated through the system during normal operation to carry the produced heat energy away from the fuel core for the formation of steam to be expended in work driving a turbine. The thus utilized coolant water and/or steam condensate is in turn cycled back into the nuclear reactor to repeat its heat energy transferring circuit substantially endlessly. This repeated circulation of coolant water throughout a vast network of vessels and conduits composed of different materials, chemical and physical conditions including temperatures, pressures and radiation, and products of radiation commonly containing corrosive agents, requires constant monitoring of the chemistry of the circulating coolant water from different locations throughout the system.

Common analytical testing procedures for nuclear fission reactor coolant water comprises sequentially sampling individual water specimens from many diverse locations throughout the nuclear reactor coolant water circulating system. The sampled coolant water specimens are each transferred through a network of coolant water sample conveying conduits or tubes to a central or consolidated water analyzing instrument. The water testing instrument analyses each specimen in sequence for determining the presence of designated constituents such as chloride, sodium, potassium, sulphate, etc. and their concentrations dissolved within the coolant water samples. This soluble constituent data derived from various coolant water samples provides a basis for modifying the water chemistry as a means of controlling the content of components causing corrosion or radiation and the like potentially deleterious conditions within the coolant water circulating system.

Typical of nuclear reactor coolant water testing or monitoring apparatus and water analysis procedures is the disclosure of U.S. Pat. No. 4,472,354, issued Sep. 18, 1984. The disclosure and contents of the aforesaid U.S. Pat. No. 4,472,354 is incorporated herein by reference.

SUMMARY OF THE INVENTION

This invention constitutes an improvement in an analytical testing procedure wherein samples of nuclear reactor coolant water are sequentially collected at different locations throughout the coolant circulation system and each sample specimen conveyed to an analytical instrument for evaluation. The improvement of the invention includes a preanalysis adjustment in the pH value of the sampled coolant water specimens to stabilize ion concentrations.

OBJECTS OF THE INVENTION

It is a primary object of this invention to provide an improved means for testing the soluble contents of nuclear reactor coolant water.

It is an additional object of this invention to provide an analytical testing procedure which more accurately evaluates soluble ions within the coolant water of a nuclear fission reactor cooling system.

It is another object of this invention to provide a method of testing for the soluble contents of coolant water from different locations throughout the coolant circuit.

It is still another object of this invention to provide a procedure for analyzing nuclear reactor coolant water for its soluble contents which inhibits unbalancing of an equilibrium in solution of the coolant with any metal ion solutes derived from contact with metal vessels and conduits.

It is also an object of this invention to provide a method of testing for the soluble ion contents of nuclear reactor coolant water comprising preconditioning test samples to a pH level for stabilizing ion equilibriums.

DETAILED DESCRIPTION OF THE INVENTION

Figure 1:
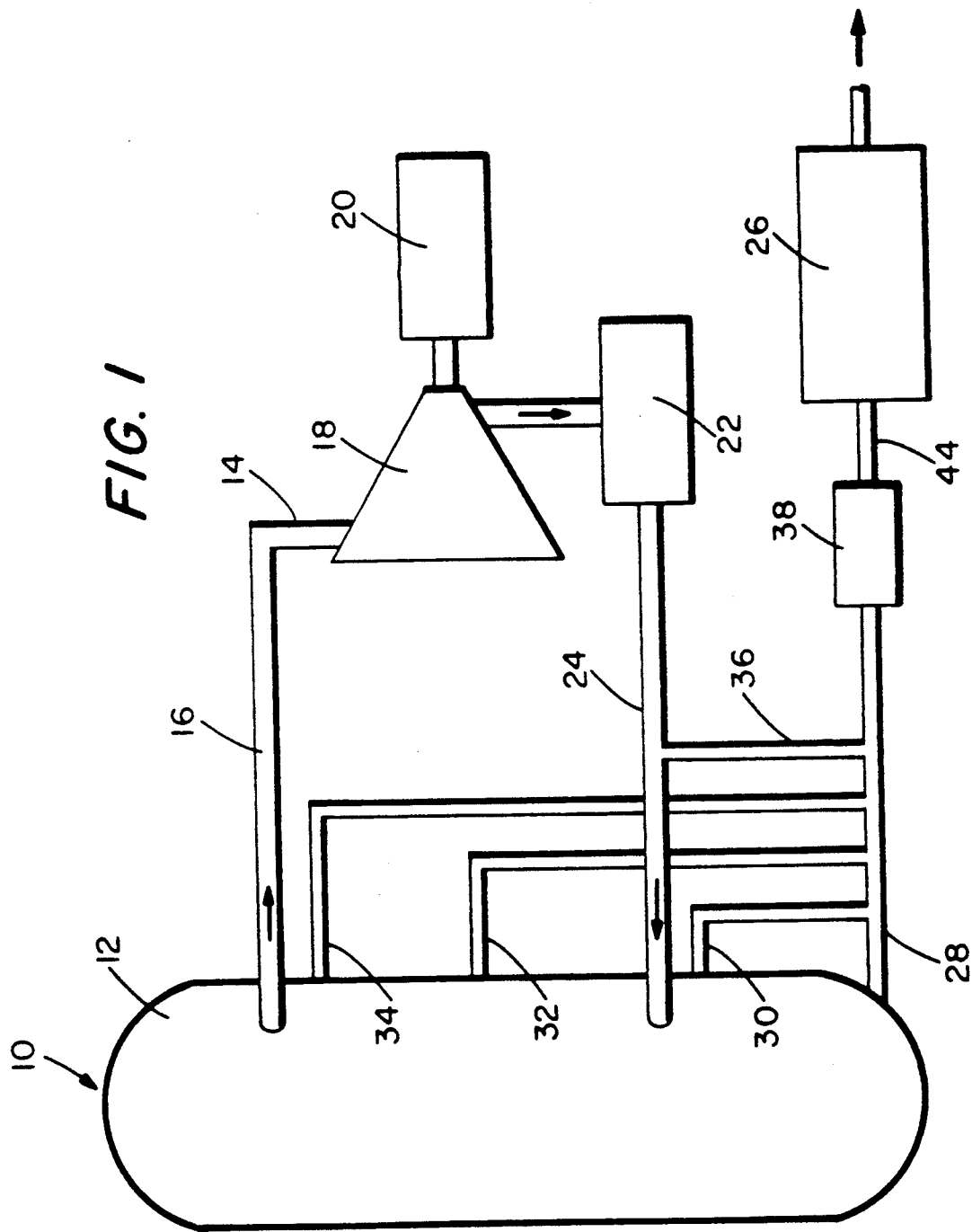
FIG. 1 of the drawings comprises a flow diagram of a nuclear fission reactor illustrating a system for taking samples of coolant water from throughout the coolant circuit and testing the water samples in an analytical instrument.

Referring to the drawings, FIG. 1 in particular, a water cooled and moderated nuclear fission reactor plant 10 comprises a reactor pressure vessel 12 housing a core of heat producing fissionable fuel (not shown). The heat producing fuel core is submerged within coolant water which continuously cycles through a reactor coolant circuit 14 for the purpose of carrying heat energy away from the fuel core in the form of pressurized hot water or steam to perform work.

Typically the heat energy transferring reactor coolant circuit 14 includes a steam conduit 16 for conveying steam generated from coolant water within the pressure vessel 12 to a steam driven turbine 18 which in turn rotates a generator 20 for producing electrical power. Spent steam and any condensation water therefrom is passed to steam condenser 22 to transform all water vapor to liquid, whereupon the condensation water is returned through return conduit 24 to the reactor pressure vessel 12, completing the cycle and for reuse as coolant water and moderator.

The coolant water/steam repeats this circuit substantially endlessly to continuously transfer heat energy from the fuel core to a means for converting it into work throughout a normal operating term.

There is an inevitable formation and accumulation of water born contaminants comprising corrosive agents and products, and fission produced and radioactive components, as well as other potentially detrimental ingredients throughout the coolant water and its circuit. This progressive concentration of contaminants within the coolant circuit system presents a potentially damaging condition with respect to equipment, especially valves and pumps, and/or can result in a build up of radioactive material which is hazardous to operating personnel.

In order to evaluate and deal with such accumulations of damaging water born containments it has become customary to routinely analyze the soluble contents of the coolant water from several different locations throughout the coolant circuit of a nuclear reactor plant. Coolant water testing means have evolved into the use of a common or consolidated water analyzing instrument provided with a network of sample drawing and conveying conduits or tubes for taking water specimen samples from multiple significant locations throughout the coolant water circulating system and transferring the specimens to the common instrument 26. For example, referring to FIG. 1 of the drawing, a series of conduits such as 28, 30, 32, 34 and 36, are provided for taking sample specimens of coolant water sequentially from a variety of different locations within the coolant water circuit and conveying the sampled water specimens to a common conduit 28 for sequential introduction into a single analytical water testing apparatus 26 for their respective evaluations.

Such a water testing arrangement provides for sequential taking of sample water specimens at different locations, and conveying streams of these sampled water specimens to and sequentially through the analytical water testing instrument for evaluation of predetermined likely solute ingredients carried in the reactor coolant water.

In the employment of nuclear reactor coolant water testing means such as described above, it was discovered that the pH levels of high purity sample specimen streams affects equilibriums established between the sample carrying conduit walls and solute ions, such as copper and zinc, contained in the flowing water or liquid solvent phase. Specifically as the pH of the conveyed water drops, namely becomes more acid, the ions affected are released from the metal conduits. Conversely, as the pH of the conveyed water increases, namely becomes more basic, the affected ions deposit-/absorb/adsorb on the exposed surfaces of metal conduits. This pH induced condition has been determined to cause erroneous transients in on-line chemistry instrumentation, or when using grab sampling techniques. This shortcoming can be significant when undertaking to monitor multiple sample streams conveyed through a common conduit when the pH values vary from sample specimen to sample specimen.

This invention constitutes an improvement in analytical testing procedures wherein samples of nuclear reactor coolant water are collected at different locations throughout the overall reactor coolant circuit and sequentially conveyed to an analytical testing instrument for evaluation. Examples of such procedures are given above and in the previously cited U.S. patent. The improvement of the invention includes a preanalysis adjustment in the pH values of the sampled water specimens.

Specifically this invention comprises a system and procedure for acidifying or lowering the pH level of a flowing sample specimen of nuclear reactor coolant water, or process stream thereof, while being carried within a conduit or tube from the sampling site to the analytical testing apparatus. The means of this invention comprise injecting an acidifying gas, such as carbon dioxide, or liquid acids, into the flowing stream of the sampled water specimen. Thus, as the applied acidifying gas dissolves within the coolant water specimen, the pH level of the water is lowered, thereby reducing deposition of cations on the walls of any downstream conduit, tubing or sample bottles. The pH level is controlled by the partial pressure of the acidic gas administered in the injected/absorbed gas mixture. The pH range should be thus adjusted to about 3.0 pH to about 5.5 pH, and preferable about 4.0 pH to about 4.5 pH.

Acidic gases suitable for lowering the pH level of coolant water specimens include carbon dioxide, hydrogen sulfide, chlorine, etc. An effective acidifying gas is one that will not contaminate the coolant water sample specimen with additional ions of those that are being monitored by the test. Carbon dioxide gas ($CO_2$) is ideal in meeting all such requirements, and is preferred. Carbon dioxide is readily soluble in water, forming a bicarbonate-carbonic acid equilibrium which effectively lowers the pH level of the water. The following equation illustrates this equilibrium reaction:

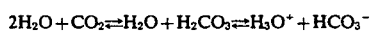

$$2H_2O + CO_2 \rightleftharpoons H_2O + H_2CO_3 \rightleftharpoons H_3O^+ + HCO_3^-$$

Laboratory evaluations of this procedure of the invention have demonstrated that the memory effect for metal ions such as copper, can be reduced to negligible levels within a specimen of coolant water following through either stainless steel or teflon tubing by means of injecting carbon dioxide gas directly into the specimen. Other acidifying gases, such as $H_2S$, $Cl_2$, $HNO_3$, etc., or aqueous solutions thereof, have shown similar effects in reducing ion memory.

Figure 2:
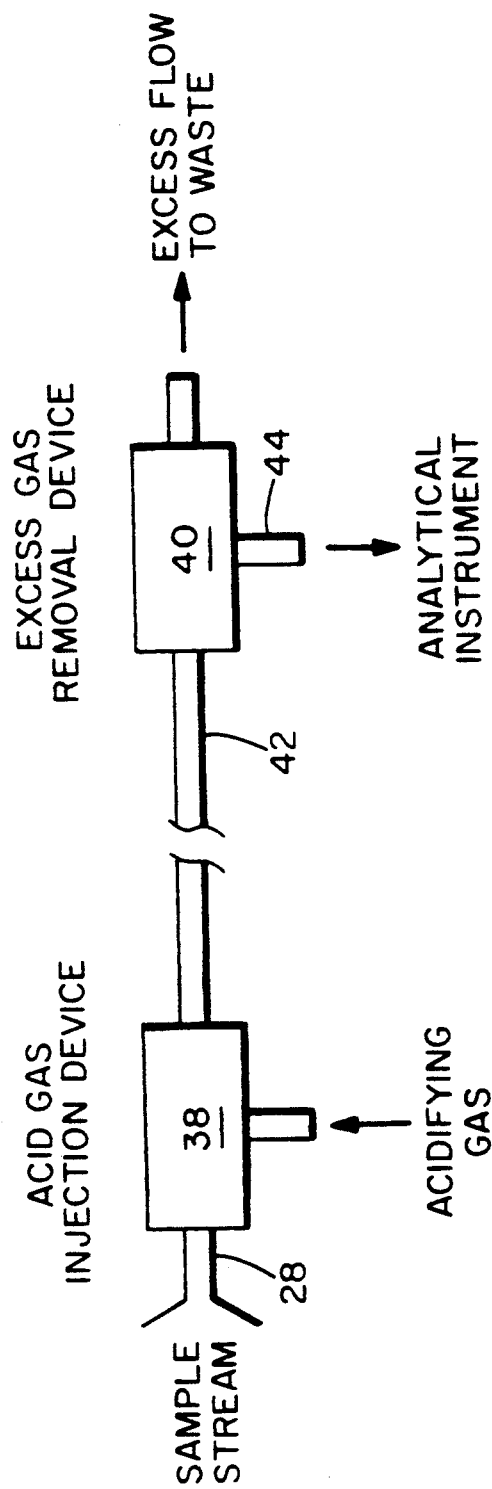
FIG. 2 of the drawings comprises a cross sectional view of one type of apparatus for carrying out the improvement of this invention.

FIG. 2 of the drawing illustrates a schematic plan for a pH reducing device 38 in accordance with this invention. As shown in this figure, coolant water sample specimens pass from the nuclear reactor coolant circuit 14 through a conduit such as 30 or 32 or 34 to conduit 28 entering the pre-conditioning, pH adjusting device 38. A suitable acidifying gas such as carbon dioxide is thus injected into the coolant water specimen flowing through device 38 thereby lowering the pH level of the water test specimen. The pre-conditioned water specimen passes from the device 38 to a gas removing device 40 through conduit 42 to expel excessive gas from the specimen. The gas removing device 40 eliminates excessive gas by means of a gas permeable, tubular membrane. The pre-conditioned specimen flows from the device 40 through conduit 44 into the analytical water testing apparatus 26 for routine determination of certain ions pursuant to convention analytical practices.

Figure 3:
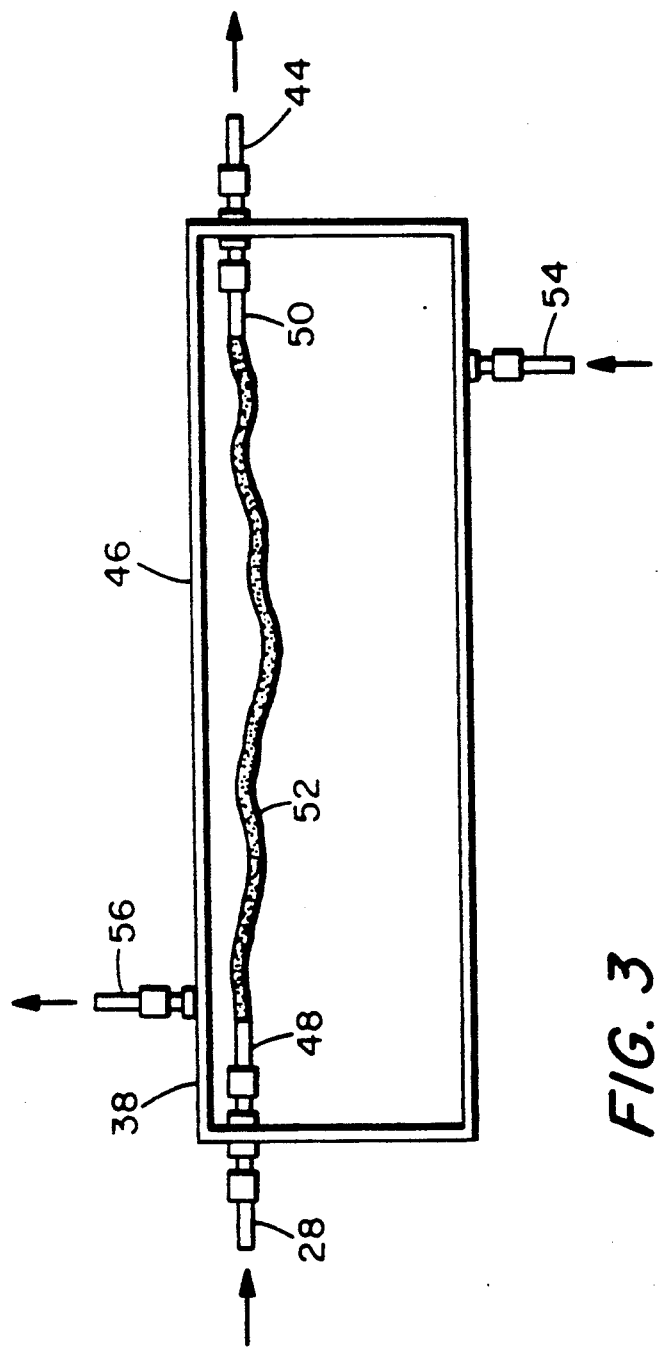
FIG. 3 of the drawing comprises a cross sectional view of another type of apparatus for carrying out the improvements of this invention.

FIG. 3 of the drawings illustrates one means for injecting an acidifying gas such as carbon dioxide into a specimen of sampled coolant water flowing through a pre-conditioning, pH adjusting device 38. This embodiment of the invention comprises a gas impermeable instrument housing 46 having a passage for the flow of a coolant water specimens therethrough. The housing 46 includes a coolant water specimen inlet 48 and outlet 50 from the housing 46, and a gas permeable tubing 52 connecting the inlet and outlet 48 and 50 and passing across the housing 46 for transporting a flow of a water specimen from conduit 28 therethrough. Gas impermeable housing 46 additionally contains a gas inlet connection 54 and a gas outlet connection 46 for the introduction of an acidifying gas into the interior of the housing and the discharge of the gas therefrom. Thus a flow of an acidifying gas can be passed through the gas impermeable instrument housing 46, and around exterior of the gas permeable tube 52 carrying therein the flowing coolant water specimen passing through the housing 46. The acidifying gas permeates through the permeable tubing 52 becoming absorbed into the water passing therethrough, reducing the pH level thereof.

EXAMPLE

An example of the problem and resolution for the practice of this invention is as follows: Two categories of samples were prepared in two liter teflon bottles. A blank (specimen 1) was drawn from the same ultrapure water supply as the standard (specimen 2). The standard was prepared by adding neutral salts to give a concentration of 5 parts per billion each for copper, zinc and nickel. The pH of each specimen was adjusted to approximately 7 and a slight over pressure of nitrogen was in each specimen bottle to prevent carbon dioxide adsorption.

The sample specimens were selected by an automatic valve which was located as close as practical to the bottles. An acidification chamber was located immediately down stream of the valve. Carbon dioxide was introduced in the bottom of the chamber and bubbled through a small volume of the water specimen samples and vented to atmosphere for the acidification test.

A coil of teflon tubing ($\frac{1}{8}$" O.D. × 1/16" I.D. × 70 ft.) was used as being the most inert test material available. This tubing represents the common specimen carrying duct between the sample manifold and the water testing or analysising ion chromatograph apparatus.

Excess specimen flow was removed at the inlet to the ion chromatograph sample pump and measured for pH. Total flow was approximately 6 ml per minute with exactly 1.5 ml per minute of the flow through the pump.

The sample sequence was programmed to alternate between blank and standard specimen sets. Each specimen set consisted of five analysis, and the data was plotted. The "before" acidification copper results are an excellent demonstration of the phenomenon of "ion memory effect" whereby absorbed metal ions are released into solution will desorb from conduit walls when solutions of a lower concentration of the same ions passes therethrough, resulting in inaccurate readings. The effect of this phenomenon was greatly reduced for the "after" acidification when carbon dioxide was bubbled through the water specimen at a rate of approximately 2 cc per minute.

This invention has an apparent buffering effect on pH and a constant flow carbon dioxide will result in a relatively stable pH when the water flow rate is varied by a factor of 4. Observed values have been pH 4.0 to 4.3 when specimen flows of 6 ml per minute to 24 ml per minute.

The means of this invention are contamination free in terms of trace metals, easy to store and have a long shelf life, and safer to handle than acids.

This invention provides an uncomplicated and reliable means for achieving pH level reductions on-line with minimal contaminations of a sample specimen. This means at best eliminates or at least reduces the ion memory effect of sample specimens. Moreover, the invention controls the pH of a coolant water stream independent of flowrate, and improves the accuracy and precision for on-line sample specimen monitoring instrumentation. The preferred acidifying gas carbon dioxide is non-toxic, acidic or basic and requires minimum precautions for safe handling, and the pH reduction achieved with this gas is limited by the solubility of carbon dioxide in water and the partial pressure of carbon dioxide in the acidifying gas thereby providing an easily controllable procedure.

What is claimed is:

1. An improved method of testing for soluble contents of coolant circulating through a water cooled and moderate nuclear fission reactor cooling system which inhibits unbalancing of an equilibrium in solutions of the coolant with metal ion solutes derived from fluid carrying metal conduits, consisting essentially of the combinations of steps of:

alternately withdrawing samples of coolant water circulating through a nuclear reactor cooling system from several different locations within the system for analysis:

conveying the alternately withdrawn coolant water samples through a network of fluid carrying metal conduits to an analytical testing apparatus for ascertaining any ion composition and concentration of each of the alternately withdrawn water coolant samples;

adjusting the pH of each withdrawn water coolant sample to an acidic state prior to passing each withdrawn water coolant sample through the analytical testing apparatus by introducing an acidifying agent into each coolant water sample; and determining the soluble contents of each coolant water sample in the analytical testing apparatus.

2. The improved method of testing for soluble contents of coolant circulating through a water cooled and moderated nuclear fission reactor cooling system which inhibits unbalancing of an equilibrium in solutions of the coolant with metal ion solutes derived from fluid carrying metal conduits of claim 1, wherein the acidifying agent is carbon dioxide gas.

3. The improved method of testing for soluble contents of coolant circulating through a water cooled and moderated nuclear fission reactor cooling system which inhibits unbalancing of an equilibrium in solutions of the coolant with metal ion solutes derived from fluid carrying metal conduits of claim 2, wherein the acidifying agent is introduced into each withdraw water coolant sample by passing the acidifying agent through a permeable membrane to each water coolant sample.

4. The improved method of testing for soluble contents of coolant circulating through a water cooled and moderated nuclear fission reactor cooling system which inhibits unbalancing of an equilibrium in solutions of the coolant with metal ion solutes derived from fluid carrying metal conduits of claim 1, wherein the acidifying agent is introduced into a coolant water sample by injecting an acidifying agent comprising an acidifying gas into each withdrawn water coolant sample.

5. An improved method of testing for soluble contents of coolant circulating through a water cooled and moderated nuclear fission reactor cooling system which inhibits unbalancing of an equilibrium in solutions of the coolant with metal ion solutes derived from fluid carrying metal conduits, consisting essentially of the combination of steps of:

alternately withdrawing samples of coolant water circulating through a nuclear reactor cooling system from several different locations for individual analysis;

conveying the alternately withdrawn coolant water samples through a network of fluid carrying metal conduits to an analytical testing apparatus for ascertaining any ion composition and concentration of each alternately withdrawn water coolant sample;

adjusting the pH of each withdrawn water coolant sample to an acidic state prior to passing each withdrawn water coolant sample through the analytical testing apparatus by introducing carbon dioxide gas as an acidifying agent into each withdrawn water coolant sample; and determining the soluble contents of each withdrawn water coolant sample in the analytical testing apparatus.

6. The improved method of testing for soluble contents of coolant circulating through a water cooled and moderated nuclear fission reactor cooling system which inhibits unbalancing of an equilibrium in solutions of the coolant with metal ion solutes derived from fluid carrying metal conduits of claim 5, wherein the carbon dioxide gas acidifying agent is introduced into each withdrawn water coolant sample by passing the acidifying carbon dioxide gas through a permeable membrane to each water coolant sample.

7. The improved method of testing for soluble contents of coolant circulating through a water cooled and moderated nuclear fission reactor cooling system which inhibits unbalancing of an equilibrium in solutions of the coolant with metal ion solutes derived form fluid carrying metal conduits of claim 5, wherein the carbon dioxide gas acidifying agent is introduced into each withdrawn water coolant sample by passing the acidifying carbon dioxide gas through a gas permeable tube carrying the sample of water coolant.

8. The improved method of testing for soluble contents of coolant circulating through a water cooled and moderated nuclear fission reactor cooling system which inhibits unbalancing of an equilibrium in solutions of the coolant with metal ions solutes derived form fluid carrying metal conduits of claim 5, wherein the carbon dioxide gas acidifying agent is introduced into each withdrawn water coolant sample by injecting the acidifying gas into the water coolant sample.

9. The improved method of testing for soluble contents of coolant circulating through a water cooled and moderated nuclear fission reactor cooling system which inhibits unbalancing of an equilibrium in solutions of the coolant with metal ion solutes derived from fluid carrying metal conduits of claim 5, wherein the pH of each withdrawn water coolant sample is adjusted to a range of about 3.0 to about 5.5.

10. An improved method of testing for soluble contents of coolant circulating through a water cooled and moderated nuclear fission reactor cooling system which inhibits unbalancing of an equilibrium in solutions of the coolant with metal ion solutes derived from fluid carrying metal conduits, consisting essentially of the combination of steps of:

alternately withdrawing samples of coolant water circulating through a nuclear reactor cooling system from several different locations for individual analysis;

conveying the alternately withdrawn coolant water samples through a network of fluid carrying metal conduits to an analytical testing apparatus for ascertaining any ion composition and concentration of each alternately withdrawn water coolant sample;

adjusting the pH of each withdrawn water coolant sample to an acidic pH in the range of about 3.0 to about 5.5 prior to passing a sample of each withdrawn water coolant sample through the analytical testing apparatus by introducing an acidifying agent into each withdrawn water coolant sample; and determining the soluble contents of each withdrawn water coolant sample in the analytical testing apparatus.

11. The improved method of testing for soluble contents of coolant circulating through a water cooled and moderated nuclear fission reactor cooling system which inhibits unbalancing of an equilibrium in solutions of the coolant with metal ion solutes derived from fluid carrying metal conduits of claim 10, wherein the acidifying agent is carbon dioxide gas.

12. The improved method of testing for soluble contents of coolant circulating through a water cooled and moderated nuclear fission reactor cooling system which inhibits unbalancing of an equilibrium in solutions of the coolant with metal ion solutes derived form fluid carrying metal conduits of claim 10, wherein the acidifying agent is introduced into a coolant water sample by passing an acidifying agent comprising an acidifying gas through a permeable membrane to each water coolant sample.

13. The improved method of testing for soluble contents of coolant circulating through a water cooled and moderated nuclear fission reactor cooling system which inhibits unbalancing of an equilibrium in solutions of the coolant with metal ion solutes derived from fluid carrying metal conduits of claim 10, wherein the acidifying agent is introduced into a coolant water sample by injecting an acidifying agent comprising an acidifying gas into each withdrawn water coolant sample.

14. An improved method of testing for soluble contents of coolant circulating through a water cooled and moderated nuclear fission reactor cooling system which inhibits unbalancing of an equilibrium in solutions of the coolant with metal ion solutes derived from fluid carrying metal conduits, consisting essentially of the combination of steps of:

alternately withdrawing samples of coolant water circulating through a nuclear reactor cooling system from several different locations for individual analysis;

conveying the alternately withdrawn coolant samples through a network of fluid carrying metal conduits to an analytical testing apparatus for ascertaining any ion composition and concentration of each alternately withdrawn water coolant sample;

adjusting the pH of each withdrawn water coolant sample to an acidic pH in the range of about 4.0 to about 4.5 prior to passing each withdrawn water coolant sample through the analytical testing apparatus by introducing carbon dioxide gas as an acidifying agent into each withdrawn water coolant sample; and determining the soluble contents of each withdrawn coolant sample in the analytical testing apparatus.

15. The improved method of testing for soluble contents of coolant circulating through a water cooled and moderated nuclear fission reactor cooling system which inhibits unbalancing of an equilibrium in solutions of any coolant with metal ion solutes derived from fluid carrying metal conduits of claim 14, wherein the carbon dioxide acidifying agent is introduced into each withdrawn water coolant sample by passing the carbon dioxide gas through a permeable membrane into the water coolant sample.

* * * * *